United States Patent [19]

Berarducci

[11] Patent Number: 4,803,617
[45] Date of Patent: Feb. 7, 1989

[54] MULTI-PROCESSOR USING SHARED BUSES

[75] Inventor: Thomas N. Berarducci, Rochester, N.Y.

[73] Assignee: Eastman Kodak Company, Rochester, N.Y.

[21] Appl. No.: 166,756

[22] Filed: Mar. 3, 1988

Related U.S. Application Data

[63] Continuation of Ser. No. 827,565, Feb. 10, 1986, abandoned.

[51] Int. Cl.[4] .................. G06F 13/40; G06F 13/14; G06F 15/16
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,242,467 | 3/1966 | Lamy | 364/200 |
| 3,800,292 | 3/1974 | Curley et al. | 340/172.5 |
| 4,051,551 | 9/1977 | Lawrie et al. | 364/200 |
| 4,058,851 | 11/1977 | Scheuneman | 364/900 |
| 4,112,502 | 9/1978 | Scheuneman | 364/900 |
| 4,237,534 | 12/1980 | Felix | 364/200 |
| 4,263,649 | 4/1981 | Lapp, Jr. | 364/200 |
| 4,365,292 | 12/1982 | Barnes et al. | 364/200 |
| 4,371,928 | 2/1983 | Barlow et al. | 364/200 |
| 4,384,323 | 5/1983 | Ahuja | 364/200 |
| 4,400,768 | 8/1983 | Tomlinson | 364/200 |
| 4,409,656 | 10/1983 | Anderson et al. | 364/200 |
| 4,481,572 | 11/1984 | Ochsner | 364/200 |
| 4,484,262 | 11/1984 | Sullivan et al. | 364/200 |
| 4,495,567 | 1/1985 | Treen | 364/200 |
| 4,547,845 | 10/1985 | Ross | 364/200 |

*Primary Examiner*—Gareth D. Shaw
*Assistant Examiner*—Kevin A. Kriess
*Attorney, Agent, or Firm*—Raymond L. Owens

[57] ABSTRACT

A multi-processor apparatus is disclosed which includes an array of separately addressable memory units and an array of separately addressable processors. A first unidirectional bus delivers data from a selected processor to a selected memory unit. A second unidirectional data bus delivers data from a selected memory unit to a selected processor. Arbitor circuits control the flow of data to these data buses.

1 Claim, 3 Drawing Sheets

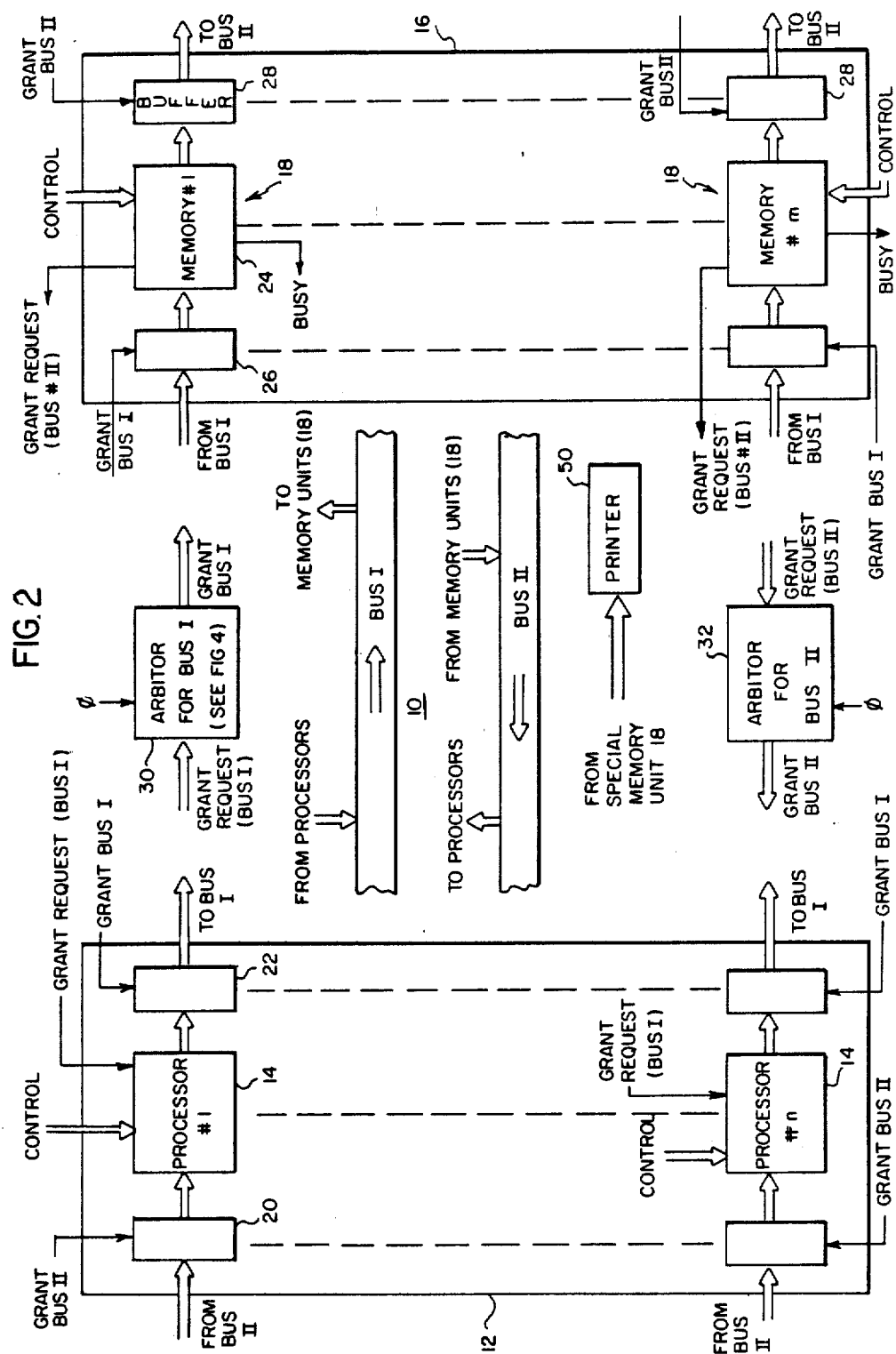

MULTI-PROCESSOR USING SHARED BUSES

This is a continuation of application Ser. No. 827,565, filed Feb. 10, 1986, now abandoned.

BACKGROUND OF THE INVENTION

1. Field of the Invention

The present invention relates to multi-processor apparatus. A multi-processor apparatus includes a plurality of processors for processing digital data and is especially suitable for use in processing digital image signals. Two or more processors can operate on data at the same time, thereby increasing data throughput.

2. Description Relative to the Prior Art

Where large amounts of digital data need to be processed, a multi-processor apparatus is often suitable for use. One particular application where multi-processor apparatus is used is in digital image processing. Digital image processing is used to perform image enhancement processing on a digital image to produce an enhanced digital image. This enhanced digital image is read out from memory and provided to a high speed "scan" printer. Large amounts of data must be processed. In order to increase the throughput rate, multi-processor apparatus having an array of processors is used. These processors are often microcomputers. Because of the amount of data involved and the need for increased throughput, the use of multi-processor apparatus is becoming more frequent.

A typical prior art multi-processor apparatus architecture is shown in FIG. 1. It operates by sharing a single bus between processors and a single large main memory (data memory). Each processor makes a request to gain control of the bus when it needs access to a location in the main memory. During each data transaction all other processors which are not busy processing data must wait for the bus to again become free. An arbitor circuit (not shown) establishes the order in which the processors can gain access to the bus. Throughput (data transfer rate) increases as the number of processors is increased. This increase in throughput continues only up to a point. Thereafter, an increase in the number of processors actually decreases the throughput.

SUMMARY OF THE INVENTION

The object of this invention is to provide a parallel processor apparatus with increased throughput.

This object is achieved by apparatus for processing digital image signals comprising an array of separately addressable memory units, each including input and output data storage means; an array of processors each including input and output data storage means; first data transfer means including a first data bus, and means for transferring data from output data storage means of a selected processor via the first data bus to the input data storage means of a selected memory unit; and second data transfer means including a second data bus, and means independent of said first transferring means for transferring data from output data storage means of a selected memory unit via the second data bus to an input data storage means of a selected processing unit.

The use of two separate data buses, the first for delivering data from the processors to the memory units and the second for delivering data from the memory units to the processors, increases throughput. Each data bus is used only for the short duration required to transfer data between data storage means.

The operation of each memory bus is controlled by separate arbitor circuits. Each arbitor circuit s independent of the other circuit. Thus, with this arrangement, data can be transferred from a processor to a memory unit while at the same time data are being transferred from a memory unit to a processor.

A feature of this invention is the provision of an efficient arbitor circuit which controls access to a bus and provides substantially equal priority in gaining access to a bus to all requesting units.

BRIEF DESCRIPTION OF THE DRAWINGS

FIG. 2 shows in block form the elements of digital image processing apparatus in accordance with the invention;

DESCRIPTION OF THE PREFERRED EMBODIMENT

Figure 1:
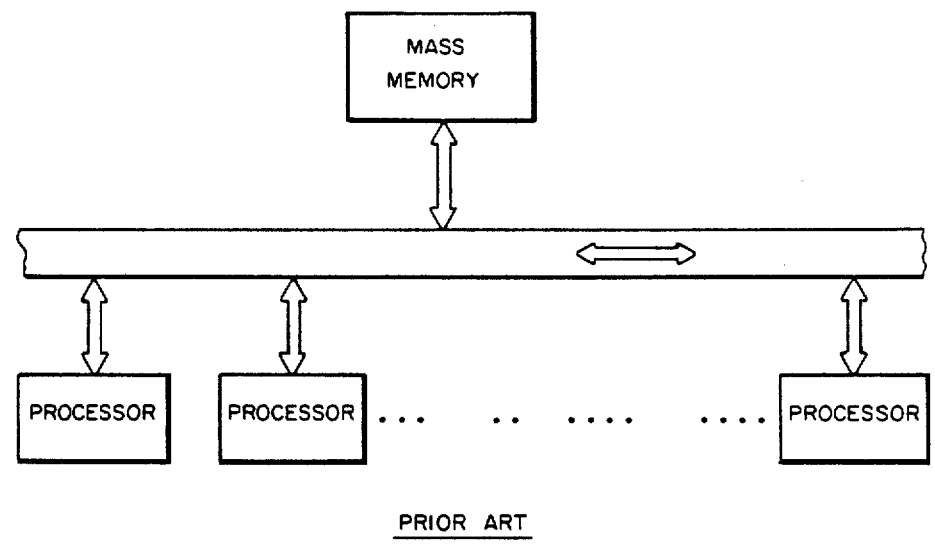
FIG. 1 is a block diagram of a conventional prior art digital image processing apparatus.

Turning now to FIG. 2, where a multi-processor apparatus 10 in accordance with the invention is shown. The apparatus is particularly suitable for processing digital images and will be described in connection with such processing. The apparatus 10 includes an array 12 having a plurality (n) of processors 14 and an array 16 having a plurality (m) of memory units 18. At this point it will be noted that the number n does not necessarily equal the number m. All processors 14 must be able to access any one of the memory units 18. Associated with each processor 14 is an input latch 20 and an output buffer 22. Each memory unit 18 includes an input latch 26 and an output buffer 28. Buffers and latches are data storage devices. A buffer is a device that transmits the signal at its input to its output. A latch is a device that stores the signal at its input in response to a clock signal. These buffers and latches include tri-state logic devices. Tri-state logic devices or gates are commonly used in the interconnection to a common bus. When a control line is enabled, the tri-state devices are coupled to the bus. When the control line is disabled, the tri-state devices act as a high-output impedance and are decoupled from the bus. BUS I is a unidirectional bus and is associated with the output buffers 22 of the processors and the input latches 26 of the memory units. An arbitor circuit 30 controls the transfer of data on BUS I from processors to memory units and an arbitor circuit 32 controls the transfer of data from memory units 18 to the processors 14. When a particular processor is ready to process data, it raises the level of a signal on a lead labeled "Grant Request." A high-level grant request signal is provided to arbitor circuit 30. The arbitor circuit 30, as will be described later, is arranged so that each processor has almost equal priority to gain access to BUS I. Arbitor circuit 30 arbitrates among all processors producing grant request signals and in accordance with a predetermined order sequentially transfers data between the output buffer 22 of each selected processor and the input latch 26 of the corresponding memory unit.

The arbitor 32 functions independently of the circuit 30 and controls the flow of data from the output buffer 28 of a selected memory unit via BUS II to the input latch 20 of a selected processor 14. BUS II is a unidirectional bus and is associated with the input latches 20 of the processors 14 and the output buffers 28 of the memory units 18. The arrangement of two unidirectional buses allows full duplex operation, that is, at any given time a processor can be transferring data to a memory unit while at the same time, a memory unit can be transferring data to another processor. Each bus is used only for the short time required to transfer data between data storage means. Each bus is operated independently of the other bus. By means of this arrangement, throughput can be significantly increased.

Other elements of the digital image processor apparatus 10 will now be briefly discussed. Prior to image processing, a digital image corresponding to a light image must be stored in the memory planes 24 of the memory units 18. The digital pixel value stored at each memory location in a memory plane 24 represents brightness or a gray scale level. For a color digital image, each digital image pixel can have 24 bits; 8 bits gray scale for red, 8 bits gray scale for green and 8 bits gray scale for blue. One of the processors can be dedicated to receive digital image data and deliver them to memory plane locations. Image sensors (not shown) operated by their own microcomputer produce analog signals corresponding to a color component of a light image. These image sensors can be, for example, CCD image area sensors. A conventional digitizer (analog/-digital convertor) digitizes these analog signals and applies them to the dedicated processor. This processor gains access to BUS I, and applies image pixel data and an address onto BUS I. This address includes not only the particular memory unit to be accessed but also the memory location in the memory plane of such unit where the digital image pixel data are to be stored. For an example of a system for producing digital images and storing them in memory locations of a memory plane, see commonly assigned U.S. patent application Ser. No. 710,242, filed Mar. 16, 1985 in the name of Milch.

The purpose of the array of digital image processors 20 (other than the dedicated processor just discussed) is to produce an enhanced digital image. A printer 50 responds to this enhanced digital image on a digital pixel by digital pixel basis to produce an output print which is more suitable for viewing than if image processing had not taken place. Digital image processing is well known and often is used in accordance with grain suppression algorithms, edge enhancement algorithms and tone scale algorithms. Examples of such digital image processing algorithms are set forth in commonly assigned U.S. Pat. Nos. 4,399,461, 4,442,454, and 4,446,484. The printer 50 can be provided by a laser printer such as disclosed in commonly assigned U.S. patent application Ser. No. 619,454 now U.S. Pat. No. 4,541,688 entitled "Light Beam Intensity Controlling Apparatus," filed June 11, 1984 in the name of Baldwin et al. Image processing algorithms, as well as other process control algorithms, necessary to control the processors are provided in memories (not shown) associated with each processor.

After all the digital image processing has been completed, an enhanced digital pixel is delivered to a particular one of the memory units 18. This memory unit causes enhanced digital pixels to be sequentially delivered to printer 50.

Figure 3:
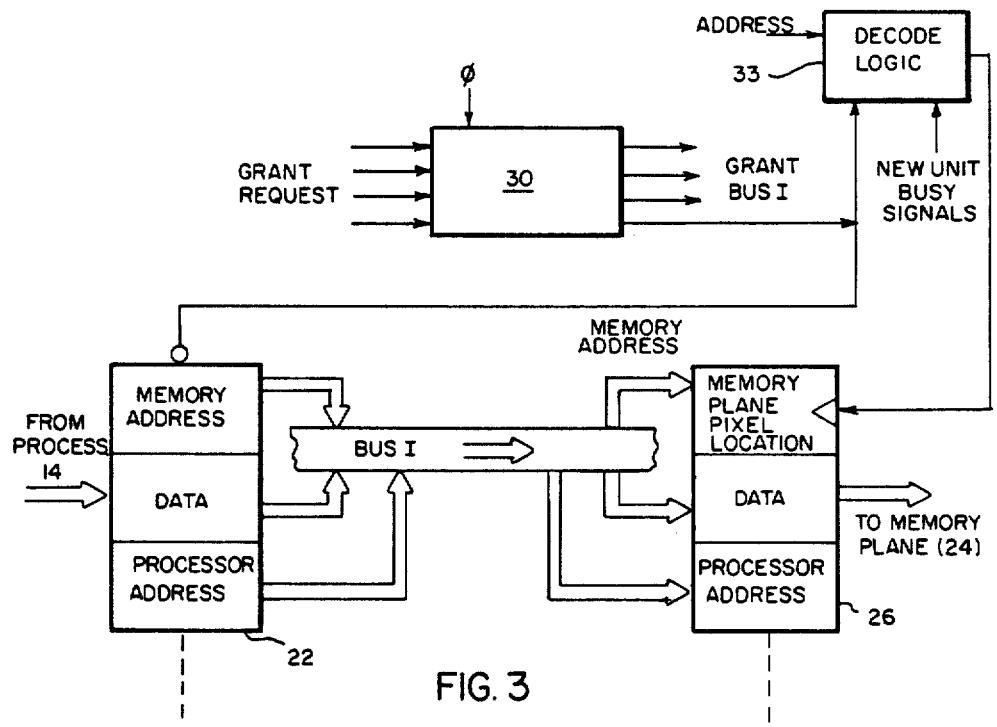
FIG. 3 is a block diagram of portions of the apparatus of FIG. 2 which illustrate the transfer of data from an output buffer of a selected processor to an input buffer of a selected memory unit.

Turning now to FIG. 3, there is shown an output buffer 22 of a selected processor 14 and an input latch 26 of a selected memory unit 18. We will assume at this point that the processor 14 for this output buffer has already produced a high-level grant signal on a Grant Request lead and provided it as an input to arbitor circuit 30. Also the selected processor has provided an address as an input to its output buffer 22. The selected processor 14 also provides its own return address as an input to buffer 22 so that the selected memory unit 18 will know the processor return address. This return address is sometimes referred to as a "packet return address." When the grant request is honored, a grant signal is produced by the circuit 30. The grant signal is provided to the output buffer 22 of the requesting processor 14. Data are then applied on BUS I from buffer 22 and delivered to all the input latches of the memory units 18. The desired memory unit is decoded by decode logic 33 from the address. If the unit is not busy, the grant signal is gated to that memory unit. In this way, these data are only entered into the latch of the addressed or selected memory unit.

The busy signal is produced by logic associated with a memory unit and indicates that it is unable to accept data. The arbitor circuit 30 will assume the grant request has been serviced and continue to service all the other grant request signals. The unserviced processor will continue to produce a grant request signal. Thereafter circuit 30 will repeat the process discussed above and will service this processor if the addressed memory unit is not busy. The operation of circuit 30 will be described in detail later with reference to FIG. 4.

Decode logic circuitry is not needed for the BUS II arbitor. The reason for this is that when a processor requests data, it will remain idle until data is delivered to it from a memory unit.

As shown in FIG. 3, a low level signal to the output buffer of the selected processor is an enabling signal to tri-state logic in such a buffer causing data to be transferred to BUS I. The small circle at the input of the buffer 22 indicates it responds to a low level signal. The small triangle or wedge in the latch 26 indicates that it is enabled by a positive going edge signal. At this point we will assume that the tri-state logic in the output buffer has applied the memory address, data and processor address onto BUS I. Thereafter, a rising edge is applied by circuit 30 through the decoding logic 33 to the selected input latch 26. All data on BUS I are latched into such selected input latch 26.

Returning now to FIG. 2, we will for the sake of explanation assume that the addressed memory unit has been instructed to deliver data from an addressed memory location in memory plane 24 to output latch 26. After such data are stored in latch 26, logic associated with the memory plane produces a high-level grant request signal and the output buffer is loaded with data from the memory location and the processor address. When the grant request to arbitor circuit 32 is honored, these data and the processor address are applied from the output buffer onto BUS II. Since the desired processor is not busy but waiting for data, the data are then delivered to the input latch 20 of the processor indicated by the packet return address via similar decoding logic as described above. This processor having received data, then performs an appropriate operation in accordance with a stored algorithm in a stored program.

Figure 4:
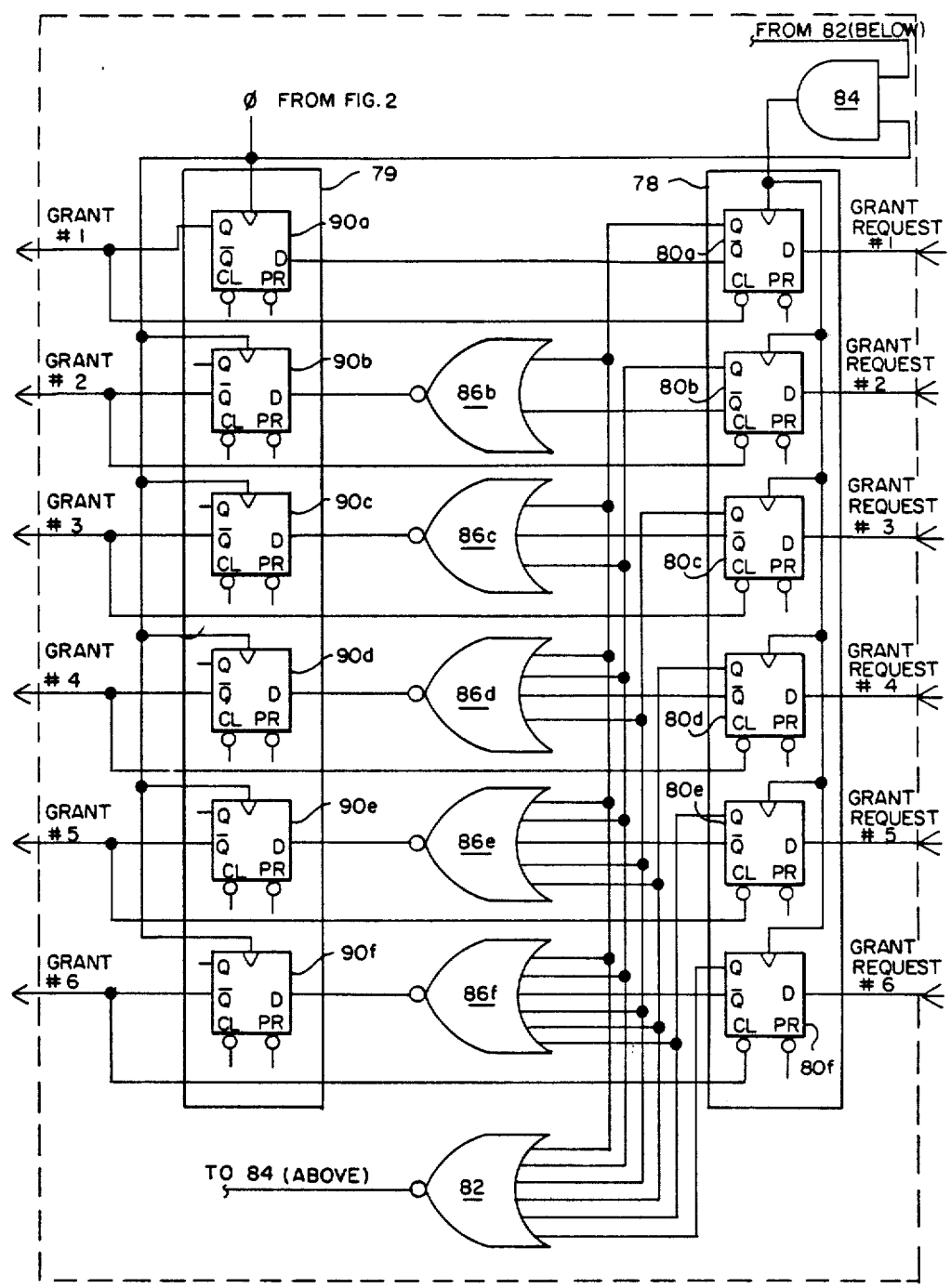
FIG. 4 is a schematic diagram of the arbitor circuit for BUS I.

Turning now to FIG. 4, a schematic diagram of arbitor circuit 30 is shown. There are provided two banks of flip/flops, 78 and 79. The first bank 78 receives the grant request signals and the second bank 79 produces the grant signals. All the flip/flops in banks 78 and 79 are D-type latches. D-type latches change their output when a rising edge is present at a clock input and assume the value of the signal applied to the terminal labeled D. Thus, if a D terminal is high when a rising clock edge is applied, the state of the flip/flop is Q=1, that is Q will be high and $\bar{Q}$ low. If the D terminal is low, the state of the flip/flop is Q=0, that is Q will be low and $\bar{Q}$ high. Each flip/flop has terminals marked PR (preset) and CL (clear) respectively. A low level signal on the PR terminal changes the flip/flop to the state Q=1 and a low level signal on the terminal CL changes the flip/flop to the state Q=0. These two inputs override any input signal on the D terminal and are independent or a synchronous of the clock signal.

Six NOR gates are included in circuit 30. A NOR gate will produce a high level output (logic "1") only if all inputs are low. If even only one input is high, it will produce a low level output (logic "0"). Now as shown in FIG. 4, there are six processors (n=6). There are six separate grant request lines, one from each processor 14. Each grant request line is connected to a D terminal of a flip/flop in bank 78. The circuit 30 has six separate grant lines, one for each processor 14.

Two examples will be used to describe the operation of circuit 30. First let us assume that a high level grant request signal is applied only on lead Grant Request 1. It is applied to the D terminal of a flip/flop 80a in bank 78. It should be noted that bank 78 includes six D-type flip/flops 80a-f. At this time, further assume all the other flip/flops 80(b-f) receive low-level grant request signals. The initial state of each flip/flop in the bank 78 is Q=0. A NOR gate 82 receives as separate inputs the Q output of each flip/flop in bank 78. NOR gate 82 provides a high-level signal to an AND gate 84. Clock signal $\phi$ from a stable clock circuit (not shown) passes through the AND gate 84 and is delivered to the clock input terminal of each flip/flop in the bank 78. In response to the rising edge of clock signal $\phi$, only the flip/flop 80a changes state. Its changed state is Q=1. A high-level input is thereby provided to NOR gates 86 (b-f) and 82. NOR gate 82 switches and provides a low level output to AND gate 84 which inhibits further clock signals from passing into the clock inputs of te flip/flops 80(a-f). Flip/flop 80a changes state and provides a high level input to the D terminal of a flip/flop 90a in bank 79. As shown, bank 79 includes six D type flip/flops 90(a-f), one for each flip/flop in bank 78. Initially, the output of each of the flip/flops in the bank 79 is high. On the next rising edge of the clock pulse, flip/flop 90a changes state to Q=0 and the output on its lead labeled GRANT 1 goes from a high level to a low level. Thus a low level signal enables the output buffer 22 of the requesting processor (see FIG. 3). This processor is now selected and delivers data to BUS I as described above. A feedback signal is also directly applied to the CL input of flip/flop 80a by the output of flip/flo? 90a. Flip/flop 80a immediately changes state and in response to this change, NOR gate 82 produces a positive high level signal to AND gate 84 permitting clock signals to be provided to the clock input terminal of each flip/flop in bank 78. The state of flip/flop 80a will cause flip/flop 90a to change its state, back to its initial state, at the next clock edge.

The second example now will be provided. Assume that there are high level signals on the leads labeled Grant Request 2 and 6 respectively. The rising edge of clock signal $\phi$ causes flip/flops 80b and 80f to change state. The output of NOR gate 82 goes low and AND gate 84 is disabled. At this time NOR gate 86f does not change state since it receives a high level input from flip/flop 80b. Request 2 will be honored before request 6. NOR gate 86b changes state and provides a high level input to the D terminal of flip/flop 90b. On the next rising edge of the clock signal, the flip/flop 90b changes state and the grant signal on Grant 2 lead goes from a high to a low level. This falling edge causes the transfer of data from the buffer 22 of the selected processor onto BUS I. It also provides a feedback signal to the CL terminal of flip/flop 80b which changes state, causing NOR gate 86b to produce a low level output. The state of flip/flop 80b will cause flip/flop 90b to change its state, back to its initial state, at the next clock edge latching the data on BUS I into the selected memory unit, if the memory unit is not busy. It should be noted that NOR gate 82 still produces a low level output. However, the change of state of flip/flop 80b causes NOR gate 86f to provide a high level signal to flip/flop 90f. On the next rising edge Of the clock, flip/flop 90b changes state as discussed above and flip/flop 90f changes state. The grant signal on the Grant 6 lead changes from a high to a low level. Thus, processor 6 is now connected to BUS I. A feedback signal from flip/flop 90f clears flip/flop 80f which through NOR gate 86f sets up flip/flop 90f to change state at the next clock edge. NOR gate 82 now enables AND gate 84 and the next set of request signals are ready to be latched into bank 78 on the next rising edge of signal $\phi$.

Arbitor circuit 32 is identical in construction to circuit 30 and so this circuit need not be shown in detail. Both of these arbiter circuits provide close to equal priority to processors and memory units in gaining access to their data buses, when viewed over several cycles of access.

The invention has been described in detail with particular reference to a certain preferred embodiment thereof, but it will be understood that variations and modifications can be effected within the spirit and scope of the invention.

I claim:

1. Multi-processor apparatus for processing digital image data in accordance with digital image processing algorithms and delivering an enhanced digital image to an image printer, comprising:

a. an array of separately addressable memory units for storing a digital image, each including input and output data storage means, each memory unit providing a request signal when it is ready to transfer digital image data and a particular address indicating where image data are to be transferred, a particular memory unit being adapted to deliver an enhanced digital image to such printer;

b. an array of individually addressable processor which operate in accordance with stored algorithms to enhance a digital image, each including input and output data storage means, and address decoding means, each processor providing a request signal when it is ready to transfer digital image data to a particular memory unit;

c. a first unidirectional data bus connected to said memory units and said processors for transferring digital image data from a selected one of the output data storage means of a particular processor to a selected one of the input data storage means of a particular memory unit;

d. a second unidirectional data bus connected to said memory units and said processors for transferring digital image data from a selected one of the output data storage means of a particular memory unit to a selected one of the input data storage means of a particular processor after its decoding means decodes its particular address; and e. data transfer controller means including a first arbitor circuit responsive to all the processor request signals for controlling the transfer of digital image data on said first bus and a second arbitor circuit independent of said first arbitor circuit and responsive to all the memory unit request signals for controlling the transfer of digital image data on said second bus.

* * * * *